US007983269B2

(12) United States Patent
Fung et al.

(10) Patent No.: US 7,983,269 B2
(45) Date of Patent: *Jul. 19, 2011

(54) ARCHITECTURE TO SUPPORT PUBLIC VOICE VPN SERVICES OVER AN IP NETWORK

(75) Inventors: Kwok T. Fung, Marlboro, NJ (US); Denny Ko, Marlboro, NJ (US); Emmanuel K. Sam, East Orange, NJ (US); Fang Wu, Holmdel, NJ (US); Eberhard F. Wunderlich, Aberdeen, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/397,740

(22) Filed: Mar. 4, 2009

(65) Prior Publication Data

US 2009/0168781 A1 Jul. 2, 2009

Related U.S. Application Data

(63) Continuation of application No. 09/948,268, filed on Sep. 6, 2001, now Pat. No. 7,533,410.

(51) Int. Cl.
*H04L 12/56* (2006.01)
(52) U.S. Cl. ...................................... 370/395.1; 726/15
(58) Field of Classification Search .................. 370/401, 370/352, 200, 260; 726/15; 713/154; 379/114
See application file for complete search history.

(56) References Cited

U.S. PATENT DOCUMENTS

| | | | |
|---|---|---|---|
| 6,081,513 A * | 6/2000 | Roy | 370/260 |
| 6,092,113 A | 7/2000 | Maeshima et al. | |
| 6,154,465 A | 11/2000 | Pickett | |
| 6,205,211 B1 * | 3/2001 | Thomas et al. | 379/114.06 |
| 6,205,488 B1 | 3/2001 | Casey et al. | |
| 6,208,658 B1 | 3/2001 | Pickett | |
| 6,222,826 B1 | 4/2001 | Faynberg et al. | |
| 6,226,748 B1 | 5/2001 | Bots et al. | |
| 6,426,955 B1 * | 7/2002 | Gossett Dalton et al. | 370/401 |
| 6,614,781 B1 | 9/2003 | Elliott et al. | |
| 7,266,683 B1 * | 9/2007 | Nag | 713/154 |
| 7,533,410 B1 * | 5/2009 | Fung et al. | 726/15 |
| 7,664,097 B2 * | 2/2010 | White et al. | 370/352 |
| 2001/0001000 A1 * | 5/2001 | Thomas et al. | 370/200 |
| 2001/0026537 A1 | 10/2001 | Massey | |
| 2001/0043571 A1 | 11/2001 | Jang et al. | |
| 2003/0031165 A1 | 2/2003 | O'Brien, Jr. | |
| 2003/0191841 A1 | 10/2003 | DeFerranti et al. | |

\* cited by examiner

*Primary Examiner* — Thong Vu

(57) ABSTRACT

The presently disclosed architecture enables a service provider to support public voice VPN services over an IP VPN network. The architecture utilizes a customer VPN, a designated gateway for the customer VPN, an IP VPN transport network, and a Call Control Element/router Complex which uses IP technology to map between the IP VPN and the voice VPN. With such an arrangement, the customer VPN is extended to the gatekeeper of the Call Control Element/router Complex, thereby enabling the provision of voice VPN services over an IP network.

20 Claims, 1 Drawing Sheet

ARCHITECTURE TO SUPPORT PUBLIC VOICE VPN SERVICES OVER AN IP NETWORK

CROSS REFERENCE TO RELATED APPLICATIONS

This application is a continuation of U.S. patent application Ser. No. 09/948,268 filed Sep. 6, 2001, which is currently allowed and is herein incorporated by reference in its entirety.

FIELD OF THE INVENTION

The present invention relates generally to the provision of voice Virtual Private Network (VPN) services and more specifically to the provision of voice VPN services over an Internet Protocol (IP) network.

BACKGROUND OF THE INVENTION

There currently exists a number of applications based on technologies that are implemented in various enterprise and carrier environments. These relevant technologies include transport-layer IP VPNs, Voice VPNs with E.164 numbering, and Enterprise VoIP networks.

A transport-layer IP VPN enables a network administration to use a shared network to offer a customer service that emulates the characteristics of a private network (such as performance, reliability, security and QoS) for the customer. An example of where a VPN has seen application is in areas where a person is working remotely from his or her office. The person can connect to a VPN over a public network, such as the Internet, and be connected with the office intranet, and thus have access to networked drives or printers as if the person were in the office. State-of-the-art technologies that are used to implement IP VPNs include MPLS, and IP tunneling protocols such as L2TP.

Voice VPNs with E.164 numbering implemented in a Public Switched Telephone Network (PSTN) typically provide customers with special customer-specific capabilities such as private numbering plan and various enhanced features such as follow me, call forwarding, etc. Other voice VPNs that are implemented using SINA (Static Integrated Network Arrangement) arrangements or private lines typically have features that are limited to capabilities supported by the customers' connected PBXs.

An enterprise VoIP network typically deploys pairs of IADs (Integrated Access Devices) in customer sites to integrate voice and data using technologies ranging from TDM (Time Division Multiplexing) to packetization technologies such as AAL2 (ATM Adaptation Layer 2).

Many of these technologies have been successfully utilized in the implementation of small-scale enterprise networks. However, the application of most of these technologies in a carrier environment to provide comprehensive voice and integrated voice and data services is still very much lacking.

It would, therefore, be desirable to provide an architecture that allows a carrier to provide full capability voice VPN services to multiple customers over a common shared packet network.

SUMMARY OF THE INVENTION

An architecture is presented which enables a service provider to support public voice VPN services over an IP VPN network. The architecture utilizes a customer VPN, a designated gateway for the customer VPN, an IP VPN transport network, and a Call Control Element/router Complex which uses IP technology to map between the IP VPN and the voice VPN. With such an arrangement the customer VPN is extended to the Call Control Element, thereby enabling the provision of voice VPN services over an IP network.

BRIEF DESCRIPTION OF THE DRAWING

The invention will be more fully understood from the following detailed description taken in conjunction with the accompanying drawing, in which.

DETAILED DESCRIPTION OF THE INVENTION

Figure 1:
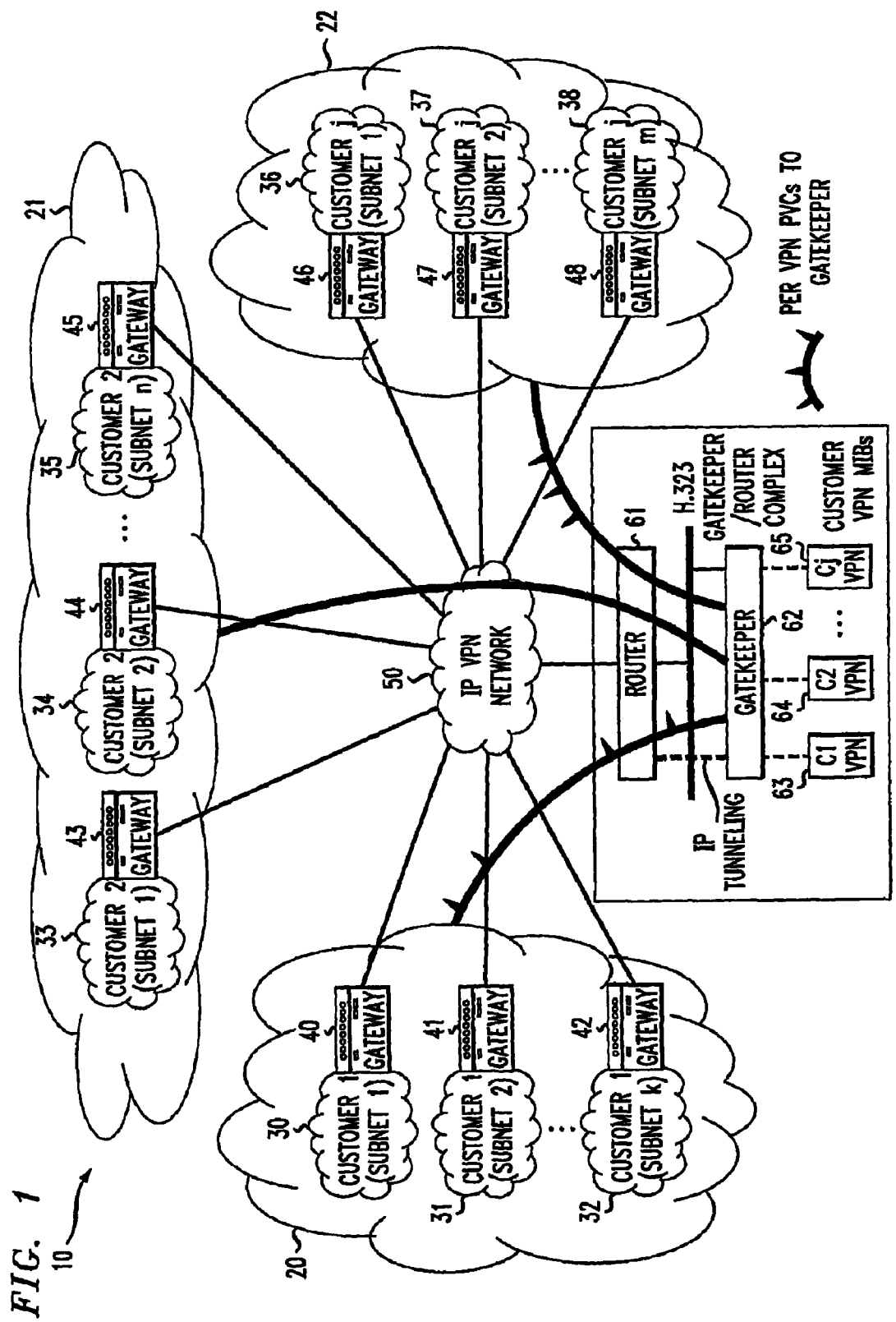
FIG. 1 is a network diagram of the proposed architecture of the present invention.

Recent advances in packetized voice technologies have made it possible for companies to implement low-cost intra-company voice services. These packetized voice technologies also enable carriers to offer cost-effective integrated voice and data services to both business and commercial customers. These emerging technologies include encoding schemes such as 6.723.1, G.729a and G.729e for increased voice compression, as well as transport protocols such as MPLS (Multiprotocol Label Switching) for supporting classes of services, better QoS (Quality of Service) handling and network engineering.

The present invention provides an architecture and methodology that enable a carrier to support public voice VPN (Virtual Private Network) services over an IP VPN network. This architecture is based on an effective, convergent application of a number of technologies to allow a carrier to provide full-capability voice VPN services to multiple customers over a common shared packet network.

FIG. 1 gives a high-level view of the architecture 10 that is utilized to provide voice VPN services for multiple customers in a shared IP network. While H.323 VoIP technology is used in this specific embodiment, the overall architecture can be extended to use other VoIP technologies such as SIP, XGCP and H.248. The H.323 VOIP technology is performing Call Agent (CA) or Call Control Element (CCE) functions. The architecture comprises three major components with certain key associated characteristics.

The first major component of the architecture are the customer VPNs 20, 21 and 22. Each customer VPN is defined by the networking capabilities for a customer to support intracompany or inter-company multimedia (voice, data and video) applications (including black phones, IP phones, H.323 terminals, etc.). Each customer location is represented as a corresponding one of IP subnet 30-38 of the customer's VPN domain and the subnets together form the customer's enterprise network. Each customer network subnet has a respective one of H.323 Gateways (GWs) 40-48 that also acts as an IP border gateway (BGP) router to the IP VPN transport backbone network 50. This configuration allows the customer VPN to be identified uniquely by an AS (Autonomous System) number. As shown in FIG. 1, there can be multiple Customer VPNs 20-22, with each customer VPN having respective subnets 30-38 and gateways (GW) 40-48. Each customer has a unique AS number associated with it.

The second major component of the architecture is the IP VPN transport network 50 which provides backbone connectivity for the customer's subnetworks through the use of, for example, ATM PVCs. A PVC is a permanent virtual circuit that is permanently available. The IP VPN transport network maps the customer AS numbers contained in the Border Gateway Protocol (BGP) messages into unique connection group identifiers.

The third major component of the architecture is the Call Agent/Call Control Element/Router Complex (CA/CCE) 60. The CA/CCE/router Complex 60 includes a router 61, a CA/CCE (Gatekeeper in the case of H.323) 62, and a VPN Management Information Base (MIB) 63-65 for each customer. The CA/CCE 60 provides call signaling and control functionality and supports per-VPN E.164 to/from IP address translation or mapping.

Per-customer numbering plans and IP address spaces are considered independent of each other so that, e.g., IP address spaces could overlap. The CA/CCE/router Complex 60 maintains a per-VPN MIB for customer VPN management and control. The VPN management information base and its maintenance are part of a service creation environment that functions as an extension of the proposed architecture to provide advanced customer voice VPN features. The CA/CCE/router Complex supports IP tunneling (e.g., using L2TP) and uses this to map between IP VPN and voice VPN by passing AS and VPN information between the router and the Gatekeeper. Each customer VPN thus has a permanent virtual circuit (PVC) extending from the customer VPN to the gatekeeper 62 of the CA/CCE/Router Complex 60.

The architecture of the present invention supports an innovative end-to-end VPN identification mechanism to effectively map a customer's VPN into a customer VPN MIB in the Gatekeeper so that customer-dependent call control is conveniently accomplished. This mechanism is based on a method that effectively implements an end-to-end VPN by converging on the following state-of-the-art technologies: the routing protocol BGP that supports the communication among Autonomous Systems and conveys unique AS numbers, any IP VPN technology such as MPLS and an IP tunneling technology such as L2TP to allow a customer's VPN to be extended between the customer's equipment and the gatekeeper.

Each customer VPN is identified by its unique AS number that is passed between the customer's subnet (Gateway) and the IP VPN transport network. The IP VPN transport network maps each AS number into a connection (e.g., ATM PVC) group to identify the customer's VPN. During call signaling and control message exchanges, the router 61 at the Gatekeeper/Router complex 60 uses an IP tunneling protocol (e.g., L2TP) to pass this AS/connection VPN information to the Gatekeeper to allow the Gatekeeper to perform VPN management and control.

The following are some key benefits provided by the proposed architecture. The architecture leverages proven state-of-the-art technologies.

The architecture supports VPNs that involve overlapping private IP addressing for multiple customers (key to the support of IP phones, IP terminals, etc.). The architecture can be adapted to any carrier's existing IP transport network (such as an MPLS network over frame relay, ATM, or an IP network with DiffServ). The architecture can effectively utilize any QoS support from the IP VPN transport network. The proposed architecture together with the end-to-end VPN identification mechanism represents a new invention that allows a carrier to implement and offer large-scale public voice VPN services using such VoIP state-of-the-art technologies as H.323, SIP, xGCP and H.248.

A specific example of how the present system supports public voice VPN services over an IP VPN network will now be described. This example is presented for explanation purposes and is not intended to limit the scope of the invention to the specific embodiment described. A call originates from customer subnet k within the Customer 1 VPN 20. The call is sent through the customer subnet k gateway to the IP VPN 50. The IP VPN 50 transports the call to the gatekeeper 62 of the gatekeeper/router complex 60. The call will have an AS number associated with it, and the AS number is transported with the call. The AS number associated with the call is used to index into the customer k VPN MIB to determine how the call is to be processed. In this instance the call is to be forwarded to subnet 2 of the customer 1 VPN 20, which is different from the original subnet k specified in the call. The corresponding customer MIB indicated in the call needs to be forwarded to a different destination within the Customer 1 VPN 20.

As described above, the architecture enables a service provider to support public voice VPN services over an IP VPN network. The architecture utilizes a customer VPN, a designated gateway for the customer VPN, an IP VPN, and a control/router element which uses IP technology to map between the IP VPN and the voice VPN. With such an arrangement, the customer VPN is extended to the gatekeeper of the control/router element, thereby enabling the provision of voice VPN services over an IP network.

Having described preferred embodiments of the invention, it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims. All publications and references cited herein are expressly incorporated herein by reference in their entirety.

What is claimed is:

1. A method for enabling a telecommunications carrier to provide a virtual private network service over an internet protocol virtual private network, comprising:
    receiving a call in the internet protocol virtual private network that originated from a customer virtual private network;
    routing the call to a gatekeeper along with a number for an autonomous system that uniquely identifies the customer virtual private network; and
    mapping at the gatekeeper the autonomous system into a connection group to facilitate routing of the call.

2. The method of claim 1, wherein the receiving is performed through an internet protocol subnet.

3. The method of claim 1, wherein the routing is performed through a permanent virtual circuit.

4. The method of claim 1, wherein the routing is performed using an internet protocol tunneling protocol.

5. The method of claim 4, wherein the internet protocol tunneling protocol comprises a layer 2 tunneling protocol.

6. The method of claim 1, wherein the mapping is performed to a per-virtual private network management information base.

7. The method of claim 1, wherein the internet protocol virtual private network comprises a multiprotocol label switching over frame relay.

8. The method of claim 1, wherein the virtual private network service comprises H.323.

9. The method of claim 1, wherein the internet protocol virtual private network comprises an asynchronous transfer mode network.

10. The method of claim 1, wherein the internet protocol virtual private network comprises an internet protocol network with diffserv.

11. An apparatus for enabling a telecommunications carrier to provide a virtual private network service over an internet protocol virtual private network, comprising:
    means for receiving a call in the internet protocol virtual private network that originated from a customer virtual private network;
    means for routing the call to a gatekeeper along with a number for an autonomous system autonomous system that uniquely identifies the customer virtual private network; and
    means for mapping at the gatekeeper the autonomous system into a connection group to facilitate routing of the call.

12. The apparatus of claim 11, wherein the receiving means receives the call through an internet protocol subnet.

13. The apparatus of claim 11, wherein the routing means routes the call through a permanent virtual circuit.

14. The apparatus of claim 11, wherein the routing means routes the call using an internet protocol tunneling protocol.

15. The apparatus of claim 14, wherein the internet protocol tunneling protocol comprises a layer 2 tunneling protocol.

16. The apparatus of claim 11, wherein the mapping means maps the autonomous system to a per-virtual private network management information base.

17. The apparatus of claim 11, wherein the internet protocol virtual private network comprises a multiprotocol label switching over frame relay network.

18. The apparatus of claim 11, wherein the virtual private network service comprises H.323.

19. The apparatus of claim 11, wherein the internet protocol virtual private network comprises an asynchronous transfer mode network.

20. The apparatus of claim 11, wherein the internet protocol virtual private network comprises an internet protocol network with diffserv.

* * * * *